H. A. MYERS.
GEAR CONTROLLER MECHANISM.
APPLICATION FILED APR. 20, 1914.
1,148,528.
Patented Aug. 3, 1915.
3 SHEETS—SHEET 1.
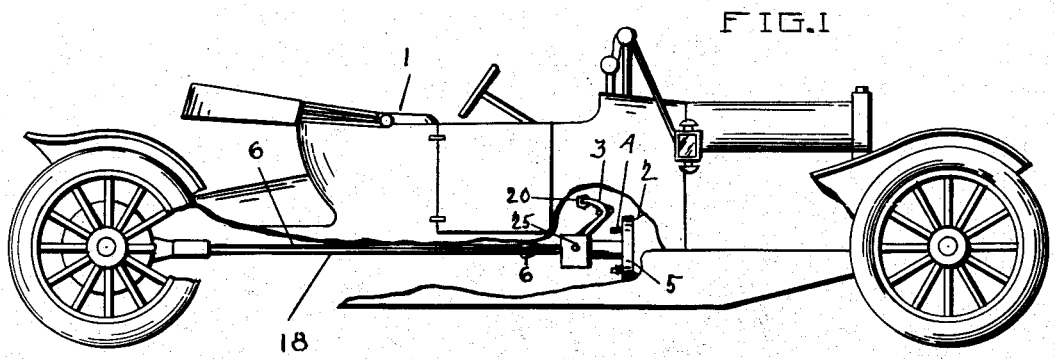
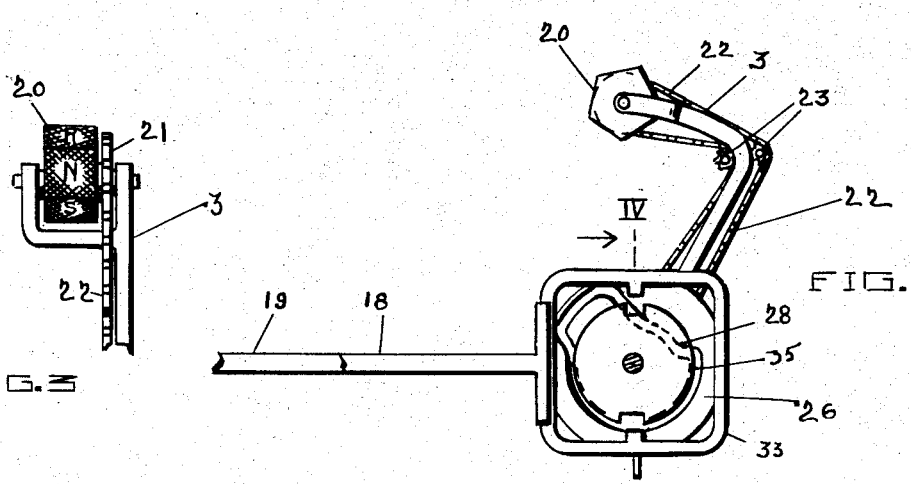
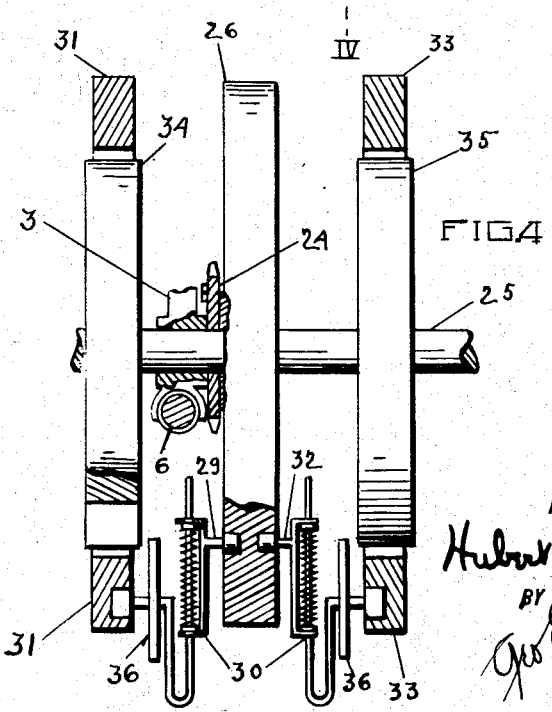
WITNESSES:
Gladys Jamieson
C. H. Rauch
INVENTOR
Hubert A. Myers
BY Geo E Kirk
ATTORNEY

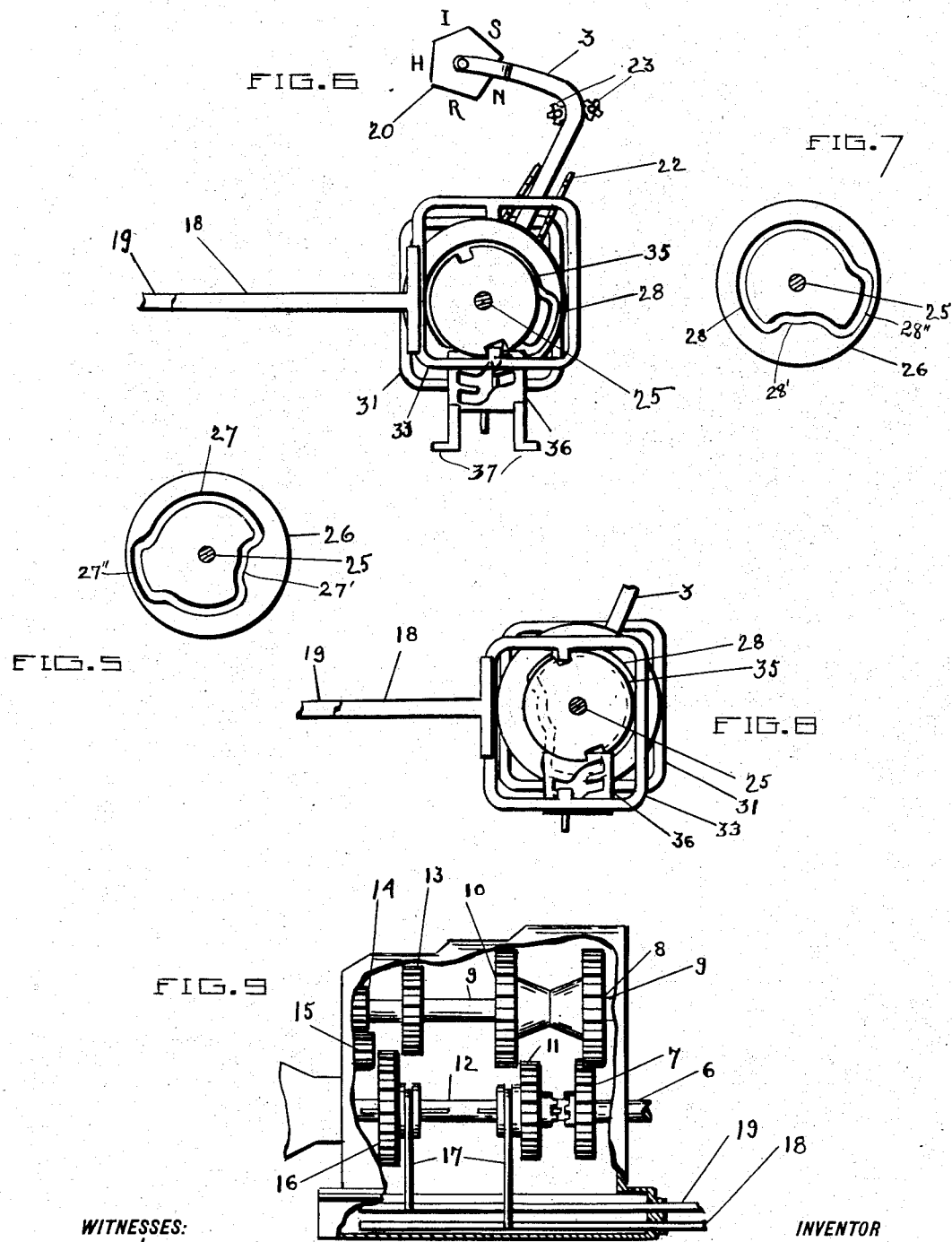

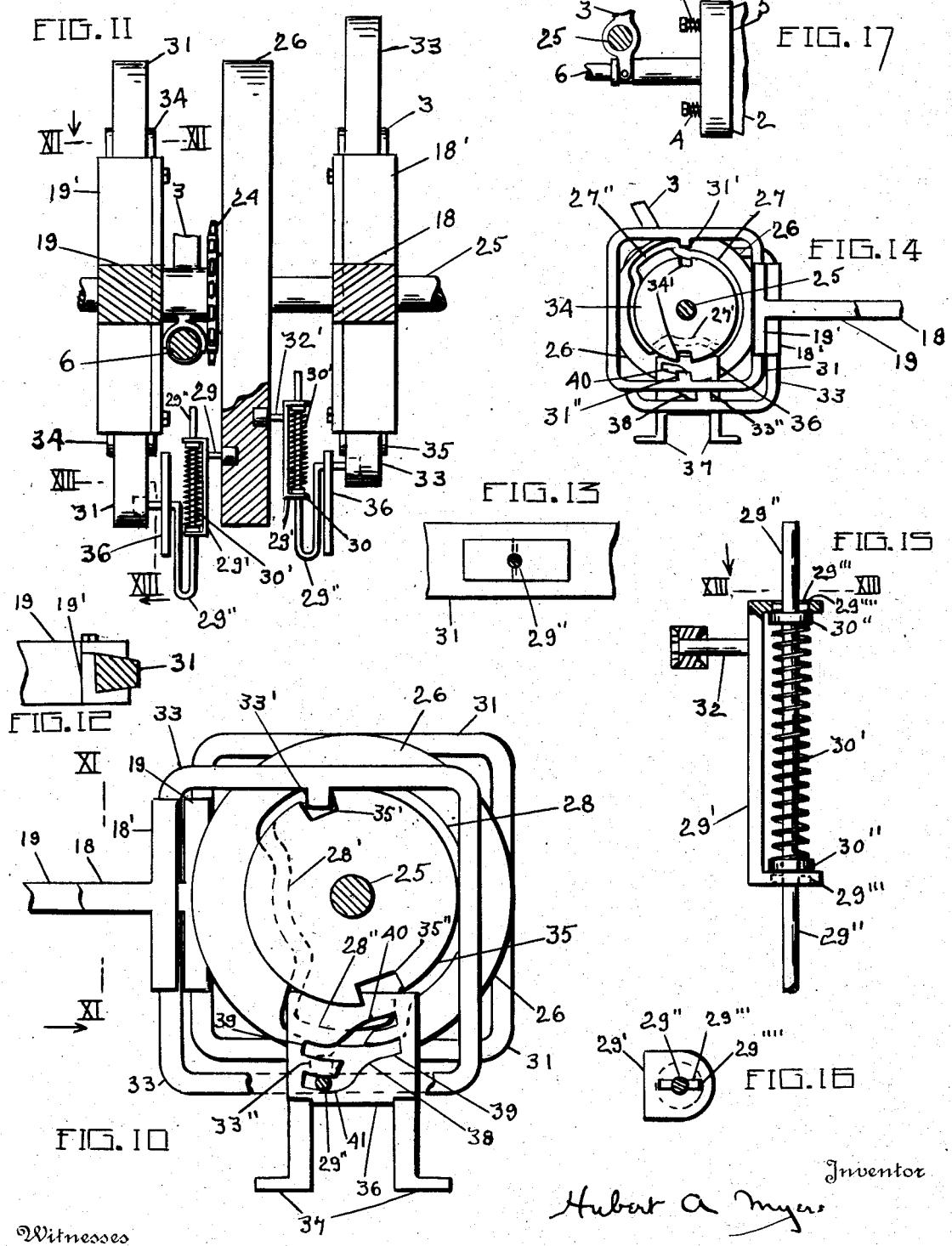

UNITED STATES PATENT OFFICE.

HUBERT A. MYERS, OF TOLEDO, OHIO, ASSIGNOR OF ONE-HALF TO ALBERT A. ATWOOD, OF TOLEDO, OHIO.

GEAR-CONTROLLER MECHANISM.

1,148,528.

Specification of Letters Patent. Patented Aug. 3, 1915.

Application filed April 20, 1914. Serial No. 833,293.

*To all whom it may concern:*

Be it known that I, HUBERT A. MYERS, a citizen of the United States of America, residing at Toledo, Lucas county, Ohio, have invented new and useful Gear-Controller Mechanisms, of which the following is a specification.

This invention relates to mechanism for establishing a plurality of driving relations between a driving member and a driven member.

This invention has utility when embodied in motor vehicles, especially in connection with the clutch pedal thereof.

Referring to the drawings: Figure 1 is a side elevation of an embodiment of the invention in a motor vehicle; Fig. 2 is a detail view on an enlarged scale of the pedal and its connections in neutral or disconnected position; Fig. 3 is a fragmentary view of the pedal tread from the left in Fig. 2; Fig. 4 is a section, on an enlarged scale, on the line IV—IV, Fig. 2, looking in the direction of the arrow; Fig. 5 is a detail view of the cam disk from the other side of the showing in Fig. 2; Fig. 6 is a view similar to Fig. 2, but with the connections shifted to high position; Fig. 7 is a detail view of the cam disk from the same side as the showing in Fig. 6; Fig. 8 is a fragmentary view of the pedal controlled mechanism with the connections shifted to intermediate position, or second speed forward; Fig. 9 is a plan view of the variable speed transmission, with parts broken away; Fig. 10 is a view similar to Fig. 8, on a larger scale and with parts broken away to more fully show the guide plate; Fig. 11 is a section on the line XI—XI, Fig. 10, looking in the direction of the arrow, but with the other yoke shifted; Fig. 12 is a section on the line XII—XII, Fig. 11, looking in the direction of the arrow; Fig. 13 is a section on the line XIII—XIII, Fig. 11, looking in the direction of the arrow; Fig. 14 is a view similar to Fig. 8, but from the opposite side thereof: Fig. 15 is a view on an enlarged scale, with parts broken away, of one of the double neutral connecting devices; Fig. 16 is a section on the line XVI—XVI, Fig. 15, looking in the direction of the arrow; and Fig. 17 is a fragmentary view of the lever and clutch connections.

The motor vehicle 1 is provided with the prime mover or internal combustion motor 2. The pedal or clutch lever 3 is actuable against the resistance of the springs 4 to disconnect the driving clutch member 5 from the driving shaft or member 6. Accordingly the springs 4 normally maintain the motor 2 in driving connection with the shaft 6 (Fig. 9). Fast on the shaft 6 is the gear 7 in mesh with the gear 8 on the countershaft 9 which also has fast thereon the gear 10. The gear 11 splined on the shaft 12 may connect this driven member 12 for driving at intermediate or second speed forward through the gear 10, or for direct high speed forward through the clutching connection rendered operative in shifting the gear 11 toward the gear 7. The shaft 9 also has fast thereon the gears 13, 14, the latter in mesh with the intermediate gear 15, which when in mesh with the gear 16 on the shaft 12 gives reverse driving connection. When this gear 16 splined on the shaft 12 is shifted to mesh with the gear 13, the parts are connected for slow speed forward. The elements in Fig. 9 are shown in neutral, or disconnected position. The forks 17, through the reciprocation of the rods 18, 19, effect the shifting of the gears for the different driving relation connections.

The foot lever or pedal 3 is provided with the movable tread 20 effective through the sprocket wheel 21, sprocket chain 22 passing over the idlers 23, to the sprocket wheel 24, on the shaft 25 for shifting the cam disk 26 into the desired selecting positions as indicated by the faces of the tread 20. The disk 26 has cam groove inactive section 27, reverse section 27' and slow speed forward section 27" on one side, to shift the bar 19, and on the other side the cam groove neutral or inactive section 28, intermediate or second speed forward section 28' and high speed forward section 28" to shift the bar 18. Coacting with the groove 27, 27', 27" is the pin 29 having the connection 30 to the yoke 31 connected with a vertical slide 19' to horizontally reciprocate the rod 19. Coacting with the groove 28, 28', 28" is the pin 32 having a double neutral connection 30 with the yoke 33 having the slide 18' connecting this yoke to reciprocate the rod 18.

The double neutral connections 30 embody the spring 30' abutting the collars 30". The pins 29, 32 terminate in yoke sections 29' embracing said collars 30" mounted on the rods 29" carrying pins 29''' movable through slots 29'''' in the yoke 29'. When the disk 26 acts through one of its grooves to shift a yoke 29' up or down from its central or neutral disconnected position, the spring 30' permits such shifting of the yoke, the spring being compressed between one side of the yoke 29' and the opposing pin 29''', thereby urging the rod 29" to act in accordance with the shifting of the yoke 29'.

The selector 20 may be shifted at any time to any desired driving relation indication, which shifting is permitted by the yieldable devices 30. While this selection is completed with such movement of the tread 20 relatively to the actuator or lever 3, actual shifting does not occur. When the springs 4 have thrust the lever 3 toward the operator in connecting the clutch for driving the shaft 6, the shaft 25 fast therewith is oscillated and through the chain 22 carries with it the disk 26, as also the notched disks 34, 35, fast thereon. With the connections in the position shown in Fig. 2, the teeth 31', 31" on the yoke 31 and teeth 31', 33" on the yoke 33, are free from the notches 34', 35', 35" in the disks 34, 35, and no shifting of the yokes 31, 33, occurs, and accordingly, there is no shifting of the gears in the transmission.

With the selector rotated, say with the H face of the tread 20 in position for receiving the forward thrust of the operator's foot in using the lever 3, the groove 28 has acted upon the pin 32, for while the lever 3 is fast to the shaft 25, the wheel 24 fast with the disk 26, are loose thereon. The yieldable connection 30 permits this shifting of the pin 32, while the fixed guide 36 prevents shifting of a yoke to bring one of its teeth into meshing engagement with a notch in one of the actuator disks 34, 35, until the forward thrust of the lever 3 has brought the yokes into medial disconnecting position. The disposal of the cam grooves 27, 27', 27", 28, 28', 28", is such that but one will actuate a yoke at a time, and with the groove 28' in position to pull the yoke 33 up for tooth engagement with the lower side of the disk 35, the groove 27 holds the yoke 31 in disconnecting position, free of the disk 34. Upon the recover travel of the lever 3, the rod 18 pulls the gear 11 into position for high speed forward, by clutching with the gear 7. The wider notch 35" in the disk 35, lower portion, allows of the shorter travel in this connection than in the other shiftings by engagement with the notches 34' 35', wher the tooth engagement is with less clearance. The guide 36 holds the yoke 33 in this connection with the disk 35 until the disk 35 is oscillated in the forward travel or clutch disconnecting movement of the pedal 3, when with the connections all at neutral position any other drive selection may occur, as intermediate, or second speed forward (Fig. 8).

The guides 36 are held in fixed position by the brackets 37. These guides 36 have central junction section 38 from which oppositely extend the guide ways 38, 39, for holding the rod 29" in neutral position, i. e., directing the double neutral connection 30 to hold the yokes away from engaging position as to the actuator disks. When the double neutral connection is set for upward shifting by the disk 26, as the rod 29" reaches the junction section 38 it is directed to move in the next shifting into the way 40, while downward shifting causes the directing of this rod 29" into the way 41.

In operation, say the tread 20 is rotated to have I or intermediate face in active position, the chain 22 rotates the disk 26 so that the groove section 28" engages the rod 32 forcing the yoke 29' downwardly against the resistance of the spring 30'. The upper pin 29''' will pass up through the yoke 29' as the collar 30" is moved down. When the pedal or lever 3 is thrust forward, any shifted yoke is brought to neutral or central position at the junction section 38 in the fixed guides 36. The compressed spring 30' at once acts in the recover travel of the lever 3 to direct the rod 29" into the way 41 forcing the yoke 33 downward, bringing the tooth 33' thereof into mesh with the notch 35', and as the lever 3 travels, the yoke 33 moves the shift bar 18 rearwardly to connect the gears 10, 11, for intermediate or second speed forward driving. For change to a different speed, the tread 20 is rotated, and this operation is simply repeated, by merely thrusting the lever 3 forward to bring the intermediate gear 11 to neutral or disconnected position, when the compressed spring 30' will act in connecting for the recover travel of the lever 3 to shift the gears as selected.

There is accordingly provided herein a control means on the actuator whereby from a common source selections and driving relation connections may be effected.

What is claimed and it is desired to secure by Letters Patent is:

1. A driving member, a driven member, mechanism for establishing a plurality of driving relations therebetween, a movable actuator for effecting driving relation connection of the mechanism between the driving member and the driven member, and control means on the actuator for determining the driving relation connection, said control means being set for automatic completion of the connection on the initiation of the actuator movement.

2. A driving member, a driven member, mechanism for establishing a plurality of driving relations therebetween, a movable actuator for effecting driving relation connection of the mechanism between the driving member and the driven member, and selecting means on the actuator for determining any driving relation connection at any time, said selecting means being set for automatic completion of the connection on the initiation of the actuator movement.

3. A driving member, a driven member, mechanism for establishing a plurality of driving relations therebetween, a movable actuator movable to positively disconnect the mechanism from driving relation, and control means on the actuator for determining the selected driving relation connection for the disconnected mechanism, said control means being set for automatic completion of the connection on the initiation of the actuator movement.

4. The combination with a movable speed change connection actuator, of a selector mounted on the actuator to control the connection of the actuator, and mechanism to be controlled thereby, said selector being set for automatic completion of the connection on the initiation of the actuator movement.

5. The combination with a movable speed change connection actuator, of an independently operable selector mounted on the actuator to control the connection of the actuator, and mechanism to be controlled thereby, said selector being set for automatic completion of the connection on the initiation of the actuator movement.

6. The combination with a speed change connection pedal, of a selector mounted on the pedal to determine the connection of the pedal, and mechanism to be controlled thereby.

7. A driving member, a driven member, mechanism for establishing a plurality of driving relations therebetween, a movable actuator for effecting driving relation connection of the mechanism between the driving member and the driven member, and a control means on the actuator having a different position for each driving relation connection, said control means being set for automatic completion of the connection on the initiation of the actuator movement.

8. A driving member, a driven member, mechanism for establishing a plurality of driving relations therebetween, a pedal for effecting driving relation connection of the mechanism between the driving member and the driven member, a tread on the pedal having a different position for each driving relation connection, and connections from the tread for determining the driving relation connection.

9. The combination with a speed change connection pedal, of a tread movably mounted on the pedal and provided with connections for determining any selected speed connection, and mechanism to be controlled thereby.

10. The combination with a reciprocable actuator lever, of a fulcrum shaft therefor, a driving relation selector cam on said shaft, control means on the lever for the cam, mechanism for establishing a plurality of driving relations, and a connection from the cam to the mechanism.

11. The combination with a reciprocable actuator pedal, of a fulcrum shaft therefor, a driving relation selector cam on said shaft, a movable tread for the pedal provided with connections for shifting the cam, mechanism for establishing a plurality of driving relations, and a connection from the cam to the mechanism.

In witness whereof I affix my signature in the presence of two witnesses.

HUBERT A. MYERS.

Witnesses:
GLADYS JAMESON,
GEO. E. KIRK.